United States Patent [19]

Koyama et al.

[11] Patent Number: 5,075,159
[45] Date of Patent: Dec. 24, 1991

[54] ELECTRICALLY INSULATED COIL

[76] Inventors: Tohru Koyama, 1-6-6, Suwa-cho, Hitachi-shi, Ibaraki-ken; Chikashi Kanno, 1-17-13, Ishinazaka-cho, Hitachi-shi, Ibaraki-ken; Koo Honjyo, 146, Muramatsu, Tohkai-mura, Naka-gun, Ibaraki-ken; Noriyuki Kinjo, 7-19-1, Kanesawa-cho, Hitachi-shi, Ibaraki-ken; Ikushi Kano, 2248-77, Uchijyuku, Ishigami, Tohkai-mura, Naka-gun, Ibaraki-ken; Syoichi Maruyama, 145-5, Machii, Sekioka, Yamatsuri-machi, Higashishirakawa-gun, Fukushima-ken all o, Japan

[21] Appl. No.: 561,573
[22] Filed: Aug. 2, 1990
[30] Foreign Application Priority Data
  Aug. 18; 1989 [JP] Japan .................. 1-211359
[51] Int. Cl.$^5$ ............................ D03D 13/00
[52] U.S. Cl. .................... 428/222; 428/209; 428/273; 428/285; 428/417; 428/418

[58] Field of Search ............... 428/222, 209, 273, 283, 428/417, 418, 901; 525/524

[56] References Cited
U.S. PATENT DOCUMENTS

| 3,556,920 | 1/1971 | Balme et al. | 428/417 |
| 4,013,987 | 3/1977 | Foster | 428/324 |
| 4,335,367 | 6/1982 | Mitsui et al. | 336/205 |
| 4,336,302 | 6/1982 | Ihlein | 428/324 |
| 4,400,676 | 8/1983 | Mutsui | 336/205 |

Primary Examiner—Merrell C. Cashion, Jr.
Assistant Examiner—D. S. Nakarani
Attorney, Agent, or Firm—Antonelli, Terry, Stout & Kraus

[57] ABSTRACT

An electrically insulated coil manufactured with a composition comprising a poly-functional epoxy resin having at least three of p-(2,3-epoxy propoxy) phenyl groups and a bi-functional epoxy resin as a binding resin for a reinforced insulating base sheet and as an impregnation resin has no peeling off in its insulating layers and is capable to be used continuously under the temperature at 200° C. or above.

8 Claims, 2 Drawing Sheets

ELECTRICALLY INSULATED COIL

BACKGROUND OF THE INVENTION

1. Field of the Invention

The present invention relates to a high voltage, heat resisting electrically insulated coil which has insulating layers prepared by a poly-functional epoxy resin having at least three of p-(2,3-epoxy propoxy) phenyl groups in the molecule, and an electric rotating machine using the coil, and also relates to a method of manufacturing same.

2. Description of the Prior Art

Currently, the improvement in technology of insulation treatment has been remarkable, especially, the impregnation method of thermosetting resin of the solventless type has been rapidly developed in the field of manufacturing of high voltage electric rotating machines used under severe conditions such as a direct current motor for an electric car and for general industries in view of (1) high electrical reliability (2) good heat dissipation (3) high moisture resistance. Recently, as the increasing in capacity and the decreasing in weight and in size of electric machinery such as an electric rotating machine, the development of an insulating system which enables a rotating machine be operate for a long period continuously under the H-class condition (180° C.) or higher class. The properties of thermosetting resin composition of the solventless type which are necessary for impregnation of rotating machine coils are (1) low viscosity (less than 10 poises at impregnating time) to make the impregnation easy, (2) no generation of volatile substances to prevent void formation in a process of heating and hardening of the resin composition, (3) superior electrical and mechanical characteristics, (4) high compatibility with insulating base sheets, and (5) high heat resistance, i.e. the characteristics of thermal stability of the cured resin in short and long period is 180° C. or above.

Generally, there is a dilemma due to the molecular structure of the resin between lowering viscosity and improving heat resistance, so that molecular design of the resin is difficult. As for solventless type thermosetting resin composition for impregnation of coils of an electric rotating machine, epoxy resin compositions comprising bi-functional epoxy resins and acid anhydride are generally quoted as described in Japanese Patent Application Laid-Open No. 60-5210(1985). But, the rotating machine coils manufactured by impregnation of the epoxy resin compositions mentioned above and heat hardening them, can not be used at H-class or above class condition because depletion in mechanical and electric insulating property will begin after long term operation under F-class (temperature at 155° C. or above) condition.

Generally, as for the method to improve heat resistant property of the solventless type thermosetting resin composition, a method to introduce heterorings in the molecular structure such as in maleimide has conventionally been used. But, as the viscosity is increased by introducing the heterorings into the molecular structure of the resin, there is no resin which satisfies the demand for a resin having low viscosity and high heat resistance concurrently. In view of this point, a combination of maleimide and epoxy resin has been attempted. But, there have been problems such as lowering of heat resistance, yielding of precipitates during storage, generation of stimulative odor from the resin composition.

Recently, compositions comprising poly-functional epoxy resin having at least three functions and acid anhydrides as described in Japanese Patent Publication No. 57-13571(1982), No. 57-14763(1982), No. 62-1648(1987), No. 62-44767(1987), and in Japanese Patent Application Laid-Open No. 61-252224(1986), No. 64-4615(1989), No. 1-4615(1989) etc. have been attracting interests because of their relatively low cost, low viscosity before hardening, and high heat resistance after hardening. The Japanese Patent Application Laid-Open No. 59-12061(1984) discloses a pre-preg mica sheet using tetre-functional epoxy resin. The mica sheet is generally used to form insulating layers by winding it around a conductor, followed by hardening therein.

Mica is indispensable in the manufacturing of high voltage coils for high voltage rotating machines which are operated under severe conditions such as a direct current motor for an electric car and for general industry. But, mica itself does not have enough mechanical strength to be wound around a conductor. Therefore, mica has to be reinforced with a backing film such as glass cloth, kapton, etc., by bonding mica with a binding resin. Hitherto, as for the binding resin, bi-functional epoxy resins for general use, phenol novolak type epoxy resins, and silicone resins have been used. But, an electrically insulated coil obtained by winding an insulating base sheet which is reinforced by the binding resin around a conductor, and impregnating the wound sheet with a thermosetting resin composition, especially the poly-functional epoxy resin composition, followed by hardening the impregnated resin, have problems such that decreasing of thermal conductivity of the insulating layer due to peeling off the layer and a rapid increment in temperature of the electrically insulated coil lead to breakdown of the insulating layer.

SUMMARY OF THE INVENTION (1) Objects of the Invention

One of the objects of the present invention is to provide a high voltage electrically insulated coil and an electric rotating machine which is operable continuously under the condition of high temperature at 200° C. or above.

As a result of investigation on the cause of peeling off of the insulating layers, it has been revealed that the peeling-off is caused by decrease in binding strength of the binding resin and by generation of gas in the layer, because of lack of heat resistance of the binding resin such as the bi-functional epoxy resin for general purpose or the phenol novolak type epoxy resin at the time of hardening of the impregnated thermosetting resin in the insulating layer. And, in case of an insulating base sheet using silicone resin as a binding resin, it was found that, as lowering of mechanical strength of the insulating layer, silicone gas of low molecular weight was generated.

It is another object of the present invention to provide a high voltage electrically insulated coil and a rotating machine which is operable continuously under the condition of high temperature at 200° C. or above without peeling off of sheet in the insulating layer in the process of impregnation and thermal hardening of the impregnated thermosetting resin composition, especially a poly-functional epoxy resin composition.

The objects of the present invention are achieved by an insulated coil having laminated would layers on a conductor. The conductor consists of several layers each being insulated with a layer insulator. The insulating base sheet is reinforced with a binding resin and is wound around the conductor. The thermosetting resin impregnated in the insulating base sheet layer has a composition comprising 100-50 parts by weight of a poly-functional epoxy resin having at least three of p-(2,3-epoxy propoxy) phenyl groups and at most 50 parts by weight of a bi-functional epoxy resin as the binding resin, and a composition comprising 100-50 parts by weight of a bi-functional epoxy resin and at most 50 parts by weight of the poly-functional resin mentioned above as the impregnation resin.

The present invention makes it possible to add a phenol resin, especially a phenol novolak resin, to the binding resin as a hardening agent and to add an acid anhydride to the impregnation resin as a hardening agent. It is possible to add various kinds of generally well known additives such as hardening acceleration agents to the thermosetting impregnation resin. The present invention also provides an insulating sheet having the binding resin, especially mica sheet, and an electric rotating machine having the mica sheet.

Based on novel finding of the present invention, a method to manufacture insulated coils for various kinds of rotating machines with single kind of varnish is provided even though the class of heat resistance of the coils are different, and it simplifies remarkably the control of varnish in a production plant. Therefore, a distinct effect on cost down in the manufacturing of insulated coils can be achieved. The present invention uses a bi-functional epoxy resin in a range of at most 50 parts by weight and 100~50 parts by weight of the poly-functional epoxy resin as a binding resin. The poly-functional epoxy resin can be used solely as a binding resin. And an insulated layer having superior characteristics in heat resistance and toughness can be obtained by using a mixture of 80-55 parts by weight of the poly-functional epoxy resin and 20-45 parts by weight of the bi-functional epoxy resin as a binding resin. On the other hand, in case of an impregnation resin, a mixture of at most 50 parts by weight of the poly-functional epoxy resin and 100~50 parts by weight of the bi-functional epoxy resin is used. Although the bi-functional epoxy resin can be used solely, a mixture of 20~45 parts by weight of the poly-functional epoxy resin and 80~55 parts by weight of the bi-functional epoxy resin produces a varnish having low viscosity to make impregnating work easy, and also its hardened body has superior characteristics in heat resistance, electrical properties, and mechanical properties.

DETAILED DESCRIPTION OF THE PREFERRED EMBODIMENTS

Figure 1:
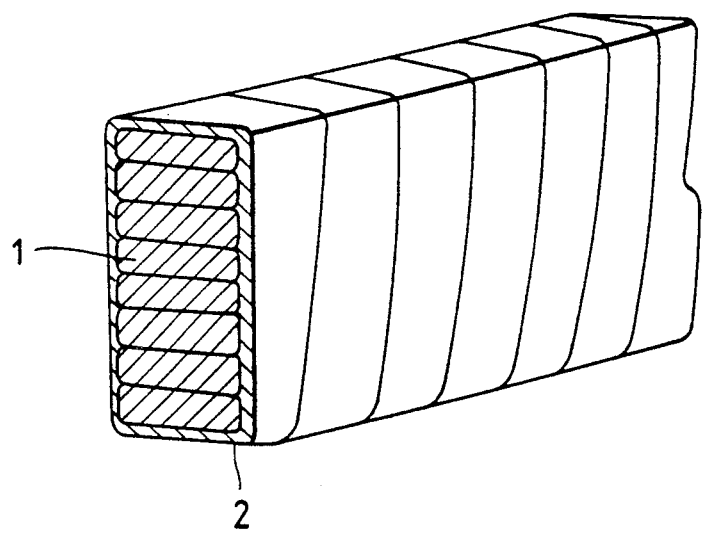
FIG. 1 is a partially cutaway view of the electrically insulated coil to which the present invention was applied.

By winding around a conductor with an insulating base sheet comprising a poly-functional epoxy resin having at least three of p-(2,3-epoxy propoxy) phenyl groups as a binding resin, impregnating with a thermosetting resin composition, especially a poly-functional epoxy resin composition or a thermosetting poly imide resin, or a mixture of them, and following heating to harden the resin, an high voltage electrically insulated coil which does not have any peeling off in the insulating layer because of no depletion of the binding resin and no decreasing in binding strength, can be manufactured and it is operable continuously under the condition of temperature at 200° C. or above. Further, in case of a poly-functional epoxy resin composition is used as a thermosetting resin for impregnation, the obtained insulating layer contains much more poly-functional epoxy resin component than the hardened body made of the poly-functional epoxy resin composition solely because the poly-functional epoxy resin in the binding resin having at least three of p-(2,3-epoxy propoxy) phenyl groups combined with the poly-functional epoxy resin composition together, and it shows increased heat resistance. As for the insulating base sheets used in the embodiments of the present invention, there are mica sheet, polyimide sheet, etc. As for the micas, there are, for example, uncalcined soft mica, calcined soft mica, uncalcined hard mica, calcined hard mica, combined mica, and alamide mixed mica, etc. As for the insulating substances for reinforcing the mica, there are no special restriction in so far as the substances can reinforce mica. The examples of such substances are glass fiber, alamide, alamide mixed paper, polyamide-imide, polyester, polyimide ether, polyether ether ketone, polyether sulfone, polyphenylene film, polyparabanic acid, and polyimide film, etc. Among them, glass fiber and polyimide film are preferable in view of heat resistance. Mica tape manufactured by bonding a mica with a reinforcing substance by a binding resin of poly-functional epoxy resin having at least three of p-(2,3-epoxy propoxy) phenyl groups, or a mixture of the poly-functional epoxy resin and a bi-functional epoxy resin, or a composition including further hardening agents, is usable in form of sheet, tape, and other optional form, but all of them are generally called "insulating base sheet" or "mica sheet" in this specification if not cited especially.

In the present invention, the word "poly-functional epoxy resin having at least three of p-(2,3-epoxy propoxy) phenyl groups means any compound in so far as the compound has at least three of p-(2,3-epoxy propoxy) phenyl groups, and there is no special restriction. Examples of such compounds are novolak type epoxy resin of bisphenol A, novolak type epoxy resin of bisphenol AD, poly-functional epoxy resin expressed by following general formula,

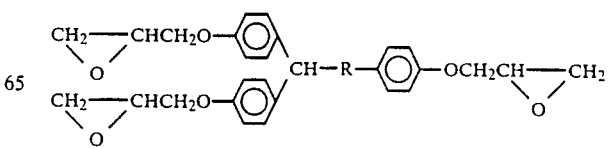

(where, R means alkylene radical, or aralkylene radical) for example,
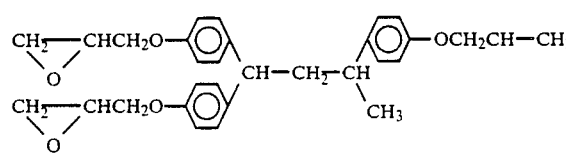
1,1,3-tris[p-(2,3-epoxy propoxy)phenyl] butane,
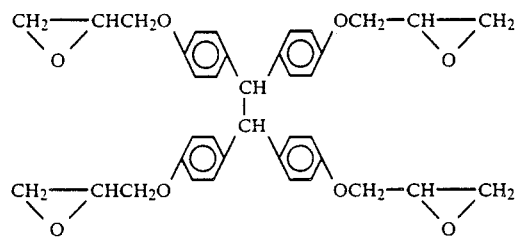
1,1,2,2-tetrakis[p-(2,3-epoxy propoxy) phenyl] ethane,
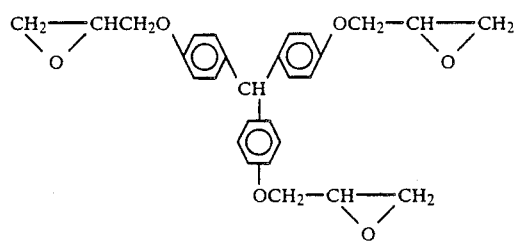
Tris[p-(2,3-epoxy propoxy) phenyl] methane,
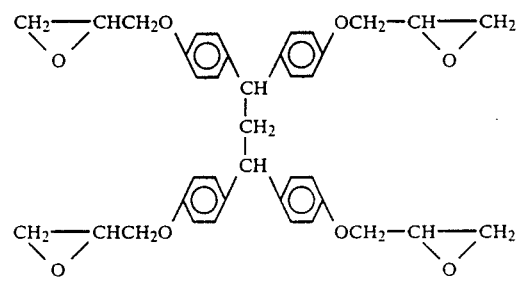
1,1,3,3-tetrakis[p-(2,3-epoxy propoxy) phenyl] propane,
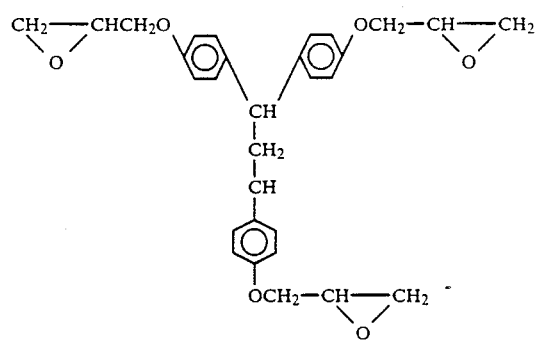
1,1,3-tris[p-(2,3-epoxy propoxy) phenyl] propane,
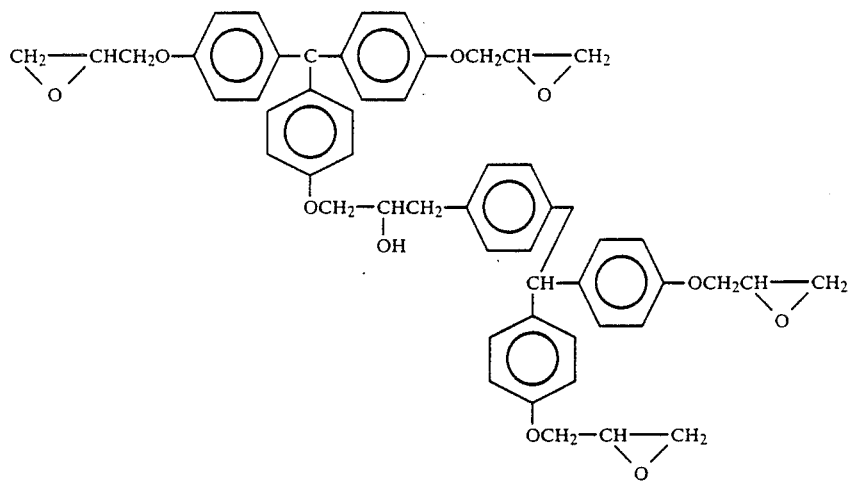
or,
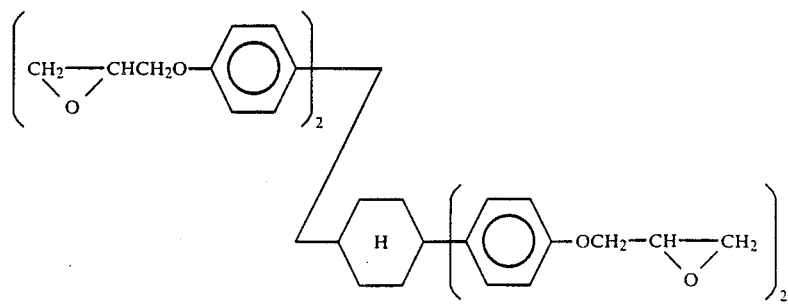

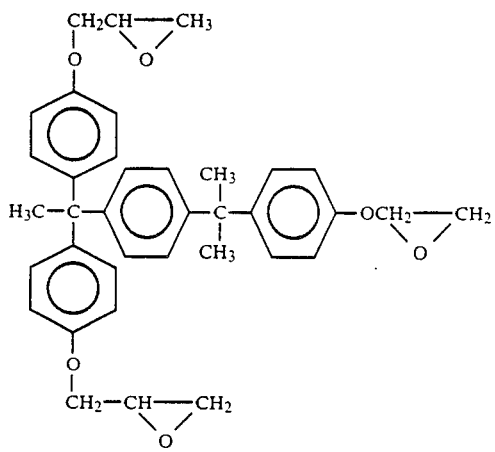

Among them, in view of heat resistance, tris[p-(2,3-epoxy propoxy) phenyl] methane and 1,1,3-tris[p-(2,3-epoxy propoxy) phenyl] butane are preferably. Also, addition of a bi-functional epoxy resin for general use to a poly-functional epoxy resin having at least three of p-(2,3-epoxy propoxy)phenyl groups using as a binding resin in the embodiments of the present invention is preferable in order to give flexibility etc. to the insulating base sheet if it is necessary for making manufacturing work easier. Such bi-functional epoxy resins are, for example, diglycidyl ether of bisphenol A, diglycidyl ether of bisphenol F, diglycidyl ether of bisphenol AD, diglycidyl ether of hydrogen added bisphenol A, diglycidyl ether of 2,2-(4-hydroxyl phenyl) nonadecane, 4,4'-bis(2,3-epoxy propyl) diphenyl ether, 3,4-epoxy cyclohexylmethyl(3,4-epoxy) cyclohexane carboxylate, 4-(1,2-epoxy propyl)-1,2-epoxy cyclohexane, 2-(3,4-epoxy)-cyclohexyl-5,5-spiro(3,4-epoxy)-cyclohexane-m-dioxane, 3,4-epoxy-6-methyl-cyclohexylmethyl-4-epoxy-6-methyl cyclohexane carboxylate etc., and there is no restriction in so far as they are bi-functional epoxy resins. Among them, in view of heat resistance, diglycidyl ether of bisphenol A, diglycidyl ether of bisphenol AD are preferable. There is no special restriction in mixing ratio of the poly-functional epoxy resin and a bi-functional epoxy resin, but, at most 50 parts by weight of a bi-functional epoxy resin is able to be mixed with 100 parts by weight of the poly-functional epoxy resin. Preferably, mixing with 20~45 parts by weight of a bi-functional epoxy resin makes it possible to obtain a flexible insulating sheet without any lowering of heat resistance. The insulating base sheet has a trend to be harder as the more poly-functional epoxy resin is added, and, on the other hand, a trend to be weaker in heat resistance as the more bi-functional epoxy resin is added. And, in case that an insulating sheet is unfavorably hard, it can be softened with a solvent and be used in the manufacturing.

Hardening agents, hardening catalysts, hardening promoters can be added to a binding resin of an insulating substance for aiming to improve heat resistance of a thermosetting resin composition. The hardening agents do not have any restriction in so far as they are conventional hardening agents for poly-functional epoxy resins. In view of self-life, phenol resin is preferable as a hardening agent. As for phenol resin, there is no special restriction in so far as it includes at least two of phenolic hydroxyl groups. Such phenol resins are, for example, phenol novolak of bisphenol A, novolak of bisphenol F, novolak of bisphenol AD, poly p-vinylphenol, resol-type phenol, etc., and they are used as sole agent or a mixture.

Also, hardening catalysts and hardening promoters do not have any restriction in so far as they are effective in accelerating the reaction of a poly-functional epoxy resin and a hardening agent. Such substances are, for example, tertiary amines such as trimethylamine, triethylamine, tetramethylbutane diamine, triethylene diamine, amines such as dimethylaminoethanol, dimethylaminopentanol, tris(dimethyl aminomethyl)phenol, N-methylmorpholine, and quaternary ammonium salts such as cetyltrimethyl ammonium bromide, cetyltrimethyl ammonium chloride, cetyltrimethyl ammonium iodide, dodecyltrimethyl ammonium bromide, dodecyltrimethyl ammonium iodide, benzyldimethyltetradecyl ammonium bromide, aryldodecyltrimethyl ammonium bromide, benzyldimethylsteary ammonium bromide, stearyltrimethyl ammonium chloride, benzyldimethyltetradecyl ammonium acetylate, imidazoles such as 2-methylimidazole, 2-ethylimidazole, 2-undecylimdazole, 2-heptadecylimidazole, 2-methyl-4-ethylimidazole, 1-butylimidazole, 1-propyl-2-methylimidazole, 1-benzyl-2-methylimidazole, 1-cyanoethyl-2-phenylimidazole, 1-cyanoethyl-2-phenylimidazole, 1-cyanoethyl-2-methylimidazole, 1-cyanoethyl-2-undecylimidazole, 1-azine-2-methylimidazole, 1-azyl-2-undecylimidazole, metalic salts of amines with zinc octoate, cobalt etc., aminotetraphenyl borates such as 1,8-diazabicyclo(5,4,0)undecane-7, N-methylpiperazine, tetramethylbutyl guanidine, triethylammonium tetraphenyl borate, 2-ethyl-4-methyltetraphenyl borate, 1,8-diazabicyclo(5,4,0)undecane-7-tetraphenyl borate, and triphenyl phosphine, triphenyl phosphonium tetraphenyl borate, aluminum trialkylacetoacetate, aluminum trisacetylacetoacetate, aluminum alcoholate, aluminum acylate, sodium alcoholate etc. The hardening catalyst is generally added to a binding resin 0.01~5 percent by weight.

Although there is no special restriction in a content of the binding resin in an insulating substance, 3~40 percent by weight, especially 5~30 percent by weight of total weight of the insulating substance such as an insulating sheet after drying are preferable. There is a tendency to lower heat resistance as the content of a binding resin increases because of less impregnation of thermosetting resin composition. But, on the other hand, decreasing in the content of the binding resin lowers the binding strength and causes peeling off of the insulating base sheet, and it makes difficult to wind the insulating base sheet around the conductor.

Thermosetting resin composition in the present invention comprising 100~50 parts by weight of a bi-functional epoxy resin and 50 parts by weight of an epoxy resin having at least three functions has low viscosity, easiness in handling and impregnation into coil, and heat resistance for H class or higher class after hardening. Although there is no special restriction in mixing ratio of a poly-functional epoxy resin and a bi-functional epoxy resin, at most 50 parts by weight, especially 45~20 parts by weight of a bi-functional epoxy resin and 100 parts by weight of a poly-functional epoxy resin is preferable. There is a tendency that the increment of poly-functional epoxy resin content causes high viscosity before hardening and much brittleness after hardening, and that, on the other hand, the increment of bi-functional epoxy resin content causes lowering of heat resistance and viscosity.

And, the poly-functional epoxy resin obtained from a reaction of a mixture of polyhydric phenols selected at least two from (a) bis(4-hydroxyphenyl) methane, (b) bis(4-hydroxyphenyl) ethane, (c) bis(4-hydroxyphenyl) propane, (d) tris(4-hydroxyphenyl) alkanes, (e) tetrakis (4-hydroxyphenyl) alkane, with epichlorohydrin are effective because of having low viscosity before hardening, easy handling property, and high heat resistance after hardening. Further, as for tris(4-hydroxyphenyl) alkane, there are tris(4-hydroxyphenyl) methane, tris(4-hydroxyphenyl) ethane, tris(4-hydroxyphenyl) propane, tris(4-hydroxyphenyl) butane, tris(4-hydroxyphenyl) hexane, tris(4-hydroxyphenyl)heptane, tri(4-hydroxyphenyl) octane, tris(4-hydroxyphenyl) nonane, etc. And, derivatives of tris(4-hydroxyphenyl) alkanes such as tris(4-hydroxyphenyl) methane are also effective. And, as for tetrakis (4-hydroxyphenyl) alkanes, there are tetrakis(4-hydroxyphenyl) methane, tetrakis(4-hydroxyphenyl) ethane, tetrakis(4-hydroxphenyl) butane, tetrakis(4-hydroxyphenyl) hexane, tetrakis(4-hydroxyphenyl) heptane, tetrakis(4-hydroxyphenyl) octane, tetrakis(4-hydroxyphenyl) nonane. Further, derivatives of tetrakis(4-hydroxyphenyl) alkanes such as tetrakis(4-hydroxy dimethylphenyl) methane, etc. are also effective. Two kind of polyhydric phenols related to the present invention are preferably including at least tris(4-hydroxyphenyl) alkanes or tetrakis (4-hydroxyphenyl) alkanes.

Acid anhydrides used in the present invention have no special restriction in so far as they are general acid anhydrides. As for such substances, there are methylhexahydrophthalic acid anhydride, hexahydrophthalic acid anhydride, methyltetrahydrophthalic acid anhydride, tetrahydrophthalic acid anhydride, nadic acid anhydride, methylnadic acid anhydride, dodecylsuccinic acid anhydride, succinic acid anhydride, octadecylsuccinic acid anhydride, maleic acid anhydride, benzophenone tetracarboxylic acid anhydride, and they are used solely or as a mixture. Among them, substances including nadic acid anhydride, methylnadic acid anhydride are preferable in view of heat resistance.

In case of using an acid anhydride hardening epoxy resin as a thermosetting resin composition for impregnation related to the present invention, if a poly-functional epoxy resin composition as a binding resin does not include any hardening agents, the obtained insulating layer contains much p-(2,3-epoxy propoxy) phenyl group components, and an equivalency of acid anhydrides and epoxy groups comes to be shifted, and lowering of heat resistance is caused. Therefore, a large amount of acid anhydride have to be added to the acid anhydride hardening epoxy resin composition for adjusting finally the equivalency ratio of acid anhydrides and epoxy groups of the insulating layers in the range 0.9~1.1.

The addition of a large amount of acid anhydrides means that the thermosetting resin composition comes to have low viscosity, and it improves easiness of the manufacturing work. Further, as a large amount of p-(2,3-epoxy propoxy) phenyl group composition having high viscosity can be added to the thermosetting resin composition, heat resistance is improved.

Also, if the binding resin of a poly-functional epoxy resin composition includes hardening agents, the obtained insulating layer contains much p-(2,3-epoxy propoxy) phenyl group component and heat resistance of the insulating layer is improved better than hardened body of the thermosetting resin composition itself.

In the process of hardening of a thermosetting resin composition for impregnation related to the present invention, addition of a hardening catalyst to the thermosetting resin composition or the insulating base sheet may be applicable, if necessary.

There is no restriction for a hardening catalyst so far as it has an effect to accelerate the reaction between a poly-functional epoxy resin and a hardening agent. As for such compounds, there are, for examples, tertiary amines such as trimethylamine, triethylamine, tetramethylbutanediamine, triethylenediamine, amines such as dimethylaminoethanol, dimethylaminophenol, tris(-dimethylaminomethyl) phenol, N-methylmorpholine etc., and quaternary ammonium salts such as cetyltrimethylammonium bromide, cetyltrimethylammonium chloride, cetyltrimethylammonium iodide, dedecyltrimethylammonium bromide, dodecyltrimethylammonium chloride, dodecyltrimethylammonium iodide, benzyldimethyltetradecylammonium chloride, benzyltetradecylammonium chloride, benzyldimethyltetradecylammonium bromide, allyldodecyltrimethylammonium bromide, benzyldimethylstearylammonium bromide, stearyltrimethylammonium chloride, benzyldimethyltetradecylammonium acetylate, imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-phenylimidazole, 1-cyanoethyl-2-methylimidazole, 1-cyanoethyl-2-undecylimidazole, 1-azine-2-methylimidazole, 1-azine-2-undecylimidazole, metallic salts of amines with zinc octoate and cobalt, etc., 1,8,-diaza-bicyclo-(5,4,4)-undecene-7, N-methyl-piperazine, tetramethylbutyl-guanidine, amino-tetraphenyl borates such as triethylammonium tetraphenyl borate, 2-ethyl-4-methyltetraphenyl borate, 1,8-diaza-bicyclo-(5,4,0)-undecene-7-tetraphenyl borate, triphenylphosphine, triphenylphosphonium tetraphenyl borate, aluminium alcoholate, aluminium acylate, sodium alcoholate, etc. The hardening catalyst such as mentioned above is generally added to a thermosetting resin composition normally 0.01-5 percent by weight. Further, the hardening catalyst may be applicable in either way of adding directly to a thermosetting resin composition or of adding to an insulating base sheet in prior to impregnation.

Further, if it is necessary, a monoepoxy resin such as cyclohexane vinylmonoxide, octylene oxide, butylglycidyl ether, stylene oxide, phenylglycidyl ether, glycidyl methacrylate, allylglycidyl ether can be added as a diluent. But, the addition of diluent, even though it has an effect to lower viscosity, should be kept generally less as it causes lowering of heat resistance.

And, as a filter, in addition to silica powder, quartz powder, alumina powder, hydrated alumina, hydrated magnesium, calcium carbonate, zirconium silicate, calcium silicate, talc, clay, mica, and glass fiber powder are applicable.

The present invention can be applicable to the manufacturing of an insulated coil for various kind of electric rotating machines. For examples, the machines are a direct current motor, an induction motor, an alternate current electric generator, a synchronized motor, etc., and the present invention is applicable to the manufacturing of their stator coil, armature coil, and field magnet coil, etc.

Generally, a manufacturing factory for electric rotating machines produces a several kind of rotating machines having different classes of heat resistance. For instance, a machine of C-class, the highest grade in heat resistance, is operated under a condition of temperature at 200° C. or above, H-class is at 180° C. or above, and F-class is at 150° C. or above.

Generally the most proper combination of a binding resin for an insulting coil and an insulating base sheet, and an impregnation resin is selected in consideration of their classes of heat resistance. Accordingly, it was necessary to keep a plurality of varnishes, a plurality of varnish-tanks, and to manage them depending on their characteristics. With the present invention, if the heat resistnace of a varnish to be impregnated into the insulating layer has a characteristics of C-class, an insulated coil having the desired heat resistance is obtainable by selecting of a binding resin, an insulating base sheet, and the hardening condition of the binding resin. Accordingly only a single kind of varnish for impregnation becomes sufficient to be ready, and it contributes to simplification of the varnish management and decreasing of manufacturing cost.

DETAILED DESCRIPTION OF THE PREFERRED EMBODIMENTS

The present invention is described in detail in the following embodiments, but is not restricted by the following embodiments. The acronyms used in the following description for epoxy resins, hardening agents, and hardening calalysts are as followings;

(1) YL-931 (Manufactured by Yuka Shell Epoxy Ltd., commercial name): 1,2,2-tetrakis[p-(2,3-epoxy propoxy) phenyl] ethane. Epoxy equivalence 192.

(2) YL-932 (Manufactured by Yuka Shell Epoxy Ltd., commercial name): 1,1,3-tris[p-(2,3-epoxy propoxy) phenyl] methane. Epoxy equivalence 162.

(3) YL-933 (Manufactured by Yuka Shell Epoxy Ltd., commercial name): 1,1,3-tris[p-(2,3-epoxy propoxy) phenyl] butane. Epoxy equivalence 196.

(4) DER-7342 (Manufactured by Dow Chemical Co., commercial name): Tris[p-(2,3-epoxy propoxy) phenyl] methane. Epoxy equivalence 162.

(5) 157S65 (Manufactured by Yuka Shell Epoxy Ltd., commercial name): Novolak type epoxy of bisphenol A. Epoxy equivalence 198.

(6) DER-332 (Manufactured by Dow Chemical Co., commercial name): Diglycidyl ether of bisphenol A. Epoxy equivalent 175.

(7) CEL-2021 (Manufactured by Daicel Ltd., commercial name): 3,4-epoxy cyclohexylmethyl(3,4-epoxy) cyclohexane carboxylate. Epoxy equivalence 138.

(8) E-807 (Manufactured by Yuka Shell Epoxy Ltd., commercial name): Diglycidyl ether of bisphenol F. Epoxy equivalence 170.

(9) MHAC-P (Manufactured by Hitachi Kasei Ltd., commercial name): Methylnadic acid anhydride. Acid anhydride equivalence 187.

(10) NH-5500 (Manufactured by Hitachi Kasei Ltd., commercial name): Methylhexahydrophthalic acid anhydride. Acid anhydride equivalence 168.

(11) HN-2200 (Manufactured by Hitachi Kasei Ltd., commercial name): Methyltetrahydrophthalic acid anhydride. Acid anhydride equivalence 166.

(12) BTPP-K (Manufactured by Hokko Kagaku Ltd., commercial name): Triphenylbutylphosphine tetraphenyl borate.

(13) PX-48T (Manufactured by Nihon Kagaku Kogyo Ltd., commercial name):

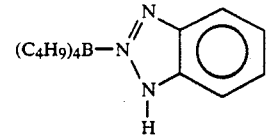

(14) 2E4MZ (Manufactured by Shikoku Kasei Ltd., commercial name): 2-ethyl-4-methylimidazole.

(15) 2E4MZ-K (Manufactured by Hokko Kagaku Ltd., commercial name): 2-ethyl-4-methylimidazole tetraphenyl borate.

(16) TPP (Manufactured by Hokko Kagaku Ltd., commercial name): Triphenylphosphine.

(17) TPP-K (Manufactured by Hokko Kagaku Ltd., commercial name): Triphenylphosphine tetraphenyl borate.

(18) IOZ (Manufactured by Hitachi Kasei Ltd., commercial name): A salt of 2-ethyl-4-methylimidazole and zinc octanoate.

(19) C11Z-AZINE (Manufactured by Shikoku Kasei Ltd., commercial name): 1-azine-2-undecylimidazole.

(20) TEA-K (Manufactured by Hokko Kagaku Ltd., commercial name): Triethylamine tetraphenyl borate.

(21) 2E4MZ-CN (Manufactured by Shikoku Kasei Ltd., commercial name): 1-cyanoethyl-2-ethyl-4-methylimidazole.

(22) PN: Phenol novolak. Hydroxyl equivalence 85.

(23) PSF (Manufactured by Gunei Kagaku Ltd., commercial name): Phenol novolak, Hydroxyl equivalence 106.

(24) Resin M (Manufactured by Maruzen sekiyu Ltd., commercial name): Poly p-vinylphenol. Hydroxyl equivalence 120.

(25) VH4150 (Manufactured by Dainihon Ink Ltd., commercial name): Novolak of bisphenol A. Hydroxyl equivalence 118.

(26) CN (Manufactured by Mitsubishi Yuka Ltd.): Cresol novolak. Hydroxyl equivalence 120.

(27) RN (Manufactured by Hitachi Kasei Ltd.,): Resol type phenol. Hydroxyl equivalence 107.

(28) BMI: 4,4'-Diphenylmethane bismaleimide.

(29) DAPPI (Manufactured by Mitsui Toatsu Ltd., commercial name): 2,2'-bis[4-(4-maleimide phenoxy) phenyl] propane.

(30) DABF (Manufactured by Osaka Soda Ltd.): Diallyl bisphenol F.

(31) TAIC (Manufactured by Nihon Kasei Ltd.): Triallyl isocyanulate.

EXAMPLE 1

(1) Manufacturing of an Insulating Base Sheet

A solution of a binding resin was prepared with YL-933 as a poly-functional epoxy resin which contains at least three of p-(2,3-epoxy propoxy) phenyl groups and methylethylketone which was used as solvent to adjust the concentration of total nonvolatile materials in the solution to 50 percent. A piling uncalcined soft mica sheet and a glass cloth were binded with the solution of the binding resin, and the solvent was evaporated. Three kind of mica tapes reinforced with a glass fiber (insulating base sheets) which contained the nonvolatile binding resin of 5, 20, and 30 percent by weight each (based on total weight of the insulating base sheet) were made. By cutting out of these insulating base sheets, tapes having 25 mm wide were obtained.

(2) Manufacturing of a Thermosetting Resin Composition

A reaction vessel equipped with a thermometer, a stirrer, dropping funnels and an apparatus for recovery of water yielded by the reaction was charged with tris(4-hydroxy phenyl) methane; 105 g, bis(4-hydroxy phenyl) propane; 105 g and epichlorohydrin; 925 g, and 175 g of 8% by weight aqueous solution of sodium hydroxide was added drop by drop in 2 hours with heating and stirring. Water and epichlorohydrin were distilled out from the reactants during the reaction, and only epichlorohydrin was went back into the reaction vessel and kept the water concentration in the reaction mixture under 5 percent by weight.

After the addition of sodium hydroxide aqueous solution finished, water was dissipated throughly by continuous heating of the reactants 15 minutes, then unreacted epichlorohydrin was distilled off.

The reaction product was dissolved by adding about 55 g of toluene to make it easy to separate the crude product from salt, and separated the crude product from salt by filtration. After toluene was distilled off completely by heating up to 170° C. under vacuum of 2 mm Hg, pale yellow epoxy resin having epoxy equivalence 171 was obtained. A thermosetting resin composition was obtained by mixing 100 parts by weight of the epoxy resin, 104.1 parts by weight of an acid anhydride hardening agent MHAC-P, and 1.021 parts by weight of a hardening catalyst 2E4MZ-CN.

(3) Manufacturing of an Electrically Insulated Coil

After a stack of insulated conductors was wound around by the insulating base sheet, the stack was impregnated with the thermosetting resin composition by the vacuum and pressurizing method, and heated 10 hours at 100° C., 3 hours at 150° C., and 10 hours at 230° C. for hardening of the resin. No peeling off was observed in the layer of the obtained electrically insulated coil. A moisture resistance test and a heat resistance test were performed by the following method.

A part of the electrically insulated coil used in the tests is shown in FIG. 1 as a perspective illustration. A stack of conductors 1 wound by the insulating base sheet 2 is molded to a monobody by impregnation and hardening of the thermosetting resin composition.

(a) Heat Resistance Test

Ten cycles test, a cycle of which consists of heating and humidifying at 270° C., 4 hours and at 40° C., 24 hours under relative humidity of 95%, was done and the value of dielectric loss tangent (tan δ) and insulating resistance were measured at each cycle. The results are shown in Table 1.

(b) Short Time Heat Resistance Test

A test piece of the insulating layer cut out from the electrically insulated coil having dimensions of 50 mm by 50 mm are used in the test of heating 10 days at 270° C. The weight of the test piece was measured after thermal depletion. The results are shown in Table 1.

(c) Moisture Resistance Test

A test piece of the insulating layer cut out from the electrically insulated coil along the direction of winding of the insulation tape having dimension of 10 mm wide and 60 mm long. Bending strength of the specimen was measured at 25° C. by 2 points hold 40 mm apart central weighing method before and after the specimen was immersed in water 24 hours at 40° C.

EXAMPLE 2~6

Insulating base sheets and electrically insulated coils were manufactured in the same method as the example 1 except using a piling calcined soft mica, an aromatic polyamide hybrid containing a piling mica, a piling uncalcined hard mica, or an uncalcined synthetic mica instead of a piling uncalcined soft mica. And heat resistance test, short time heat resistance test and moisture resistance test were performed by the same methods as the example 1.

EXAMPLE 7~25

Insulating base sheets and electrically insulated coils were manufactured by the same method as the example 1 except using each of TL-932, YL-931, PER-7342, 157S65, the epoxy resin obtained in example 1 as the reaction product of tris(4-hydroxyphenyl) methane, bis(4-hydroxyphenyl) propane and epichlorohydrin, a mixture of YL-933 and DER-332 (five kind of different mixing ratio, 5, 2, 1, 0.7, 0.5 by weight), YL-933 added 5, 2, 1, 0.5, 0.1, 0.01 by weight each of 2E4MZ-K, YL-933 added 0.1% by weight of TPP-K, YL-933 added 0.1% by weight of IOZ, YL-933 added 0.1% by weight of PX-48T, and YL-933 added 0.1% by weight of C00Z-AZINE instead of YL-933 as for the binding resin containing at least three of p-(2,3-epoxy propoxy) phenyl groups.

And the heat resistance test, the short time heat resistance test and the moisture resistance test were performed by the same method as the example 1.

EXAMPLE 26~30

Insulating base sheets and electrically insulated coils were manufactured by the same method as the example 1 except using each of a polyimide film, a polyimide ether film, a polyether ether ketone film, a polyparavansan film, an alamide mixed paper instead of a glass cloth. And the heat resistance test, the short time heat resistance test and the moisture resistance test were performed by the same method as the example 1.

COMPARATIVE EXAMPLE 1~5

Insulating base sheets and electrically insulated coils were manufactured by the same method as the example 1 except using each of DER-332, E-807, DEN-438, CEL-2021, and a silicone resin instead of YL-933 as a binding resin. And the heat resistance test, the short time heat resistance test and the moisture resistance test were performed by the same method as the example 1.

EXAMPLE 31~49

Insulating base sheets and electrically insulated coils were manufactured by the same method as the example 1 except using the thermosetting resin composition described in Table 7~10. And the heat resistance test, the short time heat resistance test and the moisture resistance test were performed by the same method as the example 1.

EXAMPLE 50

An insulating base sheet and an electrically insulated coil was prepared by the same method as the example 1 except addition of 5% by weight of C11Z-AZINE to the binding resin and lack of hardening catalyst in The thermosetting resin composition. And the heat resistance test, the short time heat resistance test and the moisture resistance test were performed by the same method as the example 1.

EXAMPLE 51

An insulating base sheet and an electrically insulated coil was prepared by the same method as the example 1 except the insulating base sheet was impregnated of 1 percent by weight of C11Z-AZINE by dipping into methanol solution of C11Z-AZINE and dried in flowing air, and lack of any hardening catalyst for the thermosetting resin composition. The heat resistance test, the short time heat resistance test and the moisture resistance test performed by the same method as the example 1.

EXAMPLE 52~60

Insulating base sheets and electrically insulated coils were manufactured by the same method as the example 1 except addition of phenol resins and hardening catalysts described in Table 11~12 to the binding resin as a hardening agent. And the heat resistance test, the short time heat resistance test and the moisture resistance test were performed by the same method as the example 1.

EXAMPLE 61~63

Insulating base sheets and electrically insulated coils were manufactured by the same method as the example 1 except addition of phenol resins and hardening catalysts described in Table 13 to the binding resin. And the heat resistance test, the short time heat resistance test and the moisture resistance test were performed by the same method as the example 1.

COMPARATIVE EXAMPLE 6~7

Insulating base sheets and electrically insulated coils were manufactured by the same method as example 61 and 63 except using DEN-438 instead of YL-933 as a binding resin. And the heat resistance test, the short time heat resistance test and the moisture resistance test were performed by the same method as the example 61 and 63.

The conditions and the results of the tests described in the examples 1-63 and comparative examples 1-7 are shown in table 1~14.

EXAMPLE 64

Insulated coils of F-class, H-class, and C-class were manufactured using only single kind of varnish with changing the hardening condition of the binding resin.

Figure 2:
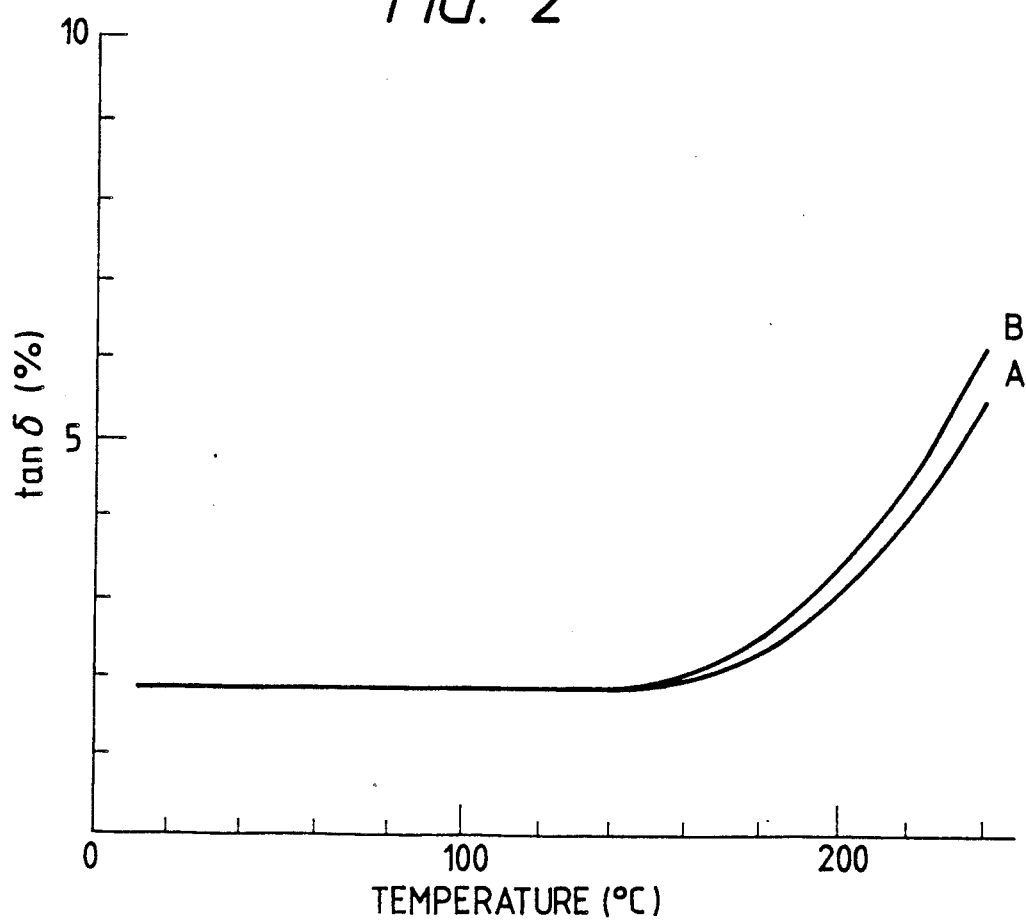
FIG. 2 is a graph showing the characteristics in dielectric loss tangent(tan δ)-temperature relation of the insulated coil to which the present invention was applied.
Figure 3:
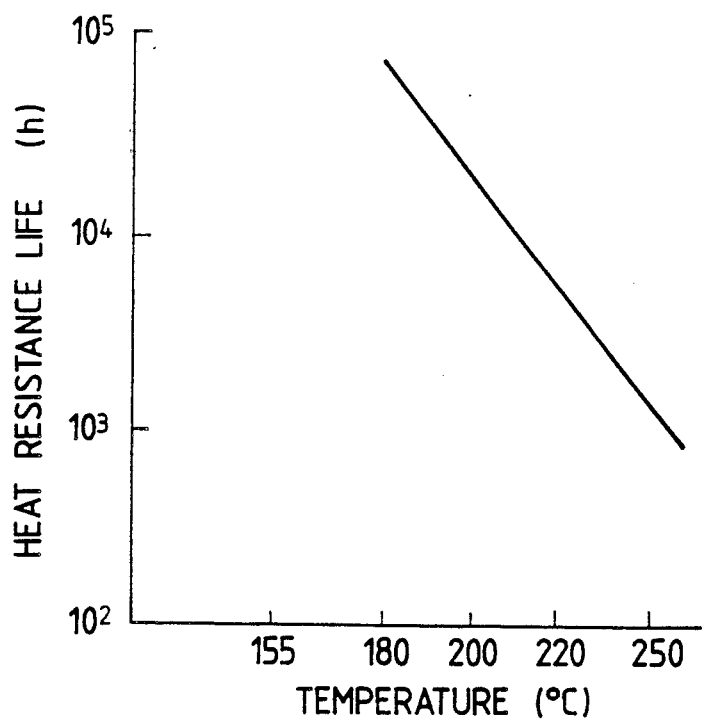
FIG. 3 is a graph showing the characteristics in heat resistant life of the insulated coil to which the present invention was applied.

The temperature dependency of dielectric loss tangent (tan δ) of the electrically insulated coil obtained in the example 1 is shown in FIG. 2 as a graph of temperature (°C., abscissa) vs. tan δ (%, ordinate). In FIG. 2, line A is the characteristic curve of sample's insulation in initial period and line B is the characteristic curve of sample's insulation after heating 1000 hours at 250° C. And, in FIG. 3, heat resistance life of the electrically insulated coil obtained by the present invention is shown as a graph of temperature (°C., abscissa) vs. heat resistance life (hour, ordinate). As shown in FIG. 3, the electrically insulated coil obtained by the present invention has good heat resistance in the heat resistance life test measured by the motorlet test based on U.S. Standard IEEE No. 275, and is found to be usable under the condition of temperature at 200° C. or above.

EXAMPLE 65~68

Figure 4:
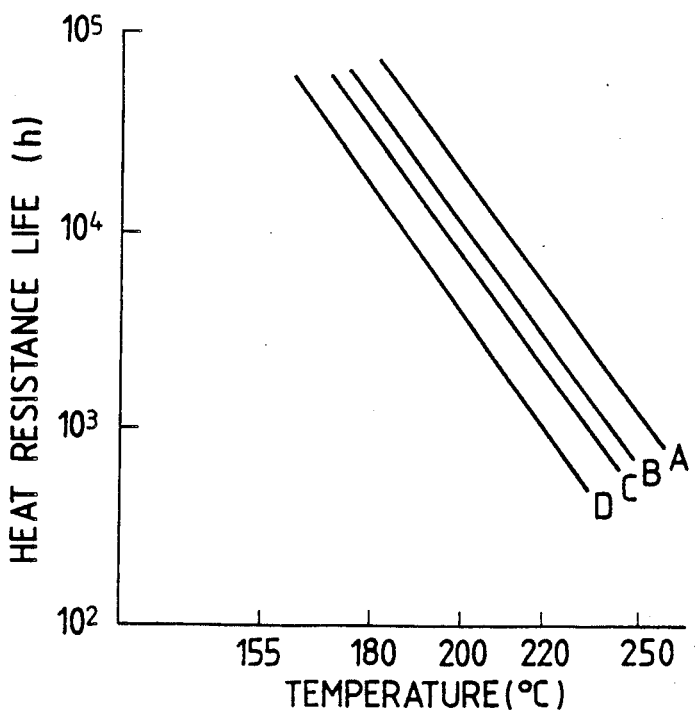
FIG. 4 is a graph showing temperature dependence of heat resistant life of the insulated coil to which the present invention was applied.

Electrically insulated coils were manufactured using single kind of impregnation varnish by the same method as the example 52 except changing of binding resins and of hardening conditions to those described in Table 15. The temperature dependency of heat resistance life of the obtained coil measured by the motorlet test based on U.S. Standard IEEE No 275 is shown in FIG. 4. In FIG. 4, each of line A, B, C, D shows the test results of the examples 64, 65, 66, 67 each. In FIG. 4, it is shown that the electrically insulated coils having three heat resistance classes each, i.e. F-class, H-class, C-class, can be prepared using only single kind of impregnation varnish by selecting a binding resin having a higher quality than F-class, an insulating base sheet and hardening condition. That is, even though using only single kind of impregnation varnish, a coil having low grade in heat resistance can be prepared by selecting a cheap binding resin, a cheap insulating base sheet and an economical hardening condition, and on the other hand, a coil having higher grade in heat resistance can be prepared by selecting a binding resin of higher grade and an insulating base sheet of high quality, and a hardening condition of high temperature and long period.

By the present invention, the electrical insulated coils of various classes in heat resistance can be prepared by using only single kind of impregnation varnish. Therefore, it is not necessary to keep various kinds of impregnation varnishes corresponding to various grades of heat resistance, and it makes possible to simplify the impregnation varnish control in a manufacturing facility and to lower greatly the production cost.

TABLE 1

| | | Embodiment | | | | |
|---|---|---|---|---|---|---|
| | | 1 | 2 | 3 | 4 | 5 |
| Insulating base sheet | Binding resin | YL-933 | YL-933 | YL-933 | YL-933 | YL-933 |
| | Mica | Piling uncalcined soft mica | Aramid containing piled mica | Piling calcined soft mica | Piling calcined soft mica | Piling uncalcined soft mica |
| | Reinforce material | Glass cloth | Glass cloth | Glass cloth | Glass cloth | Glass cloth |
| | Hardening catalyst | — | — | — | — | — |

TABLE 1-continued

| | | | Embodiment 1 | Embodiment 2 | Embodiment 3 | Embodiment 4 | Embodiment 5 |
|---|---|---|---|---|---|---|---|
| Thermosetting resin composition | Epoxy resin | | Reaction product | Reaction product | Reaction product | Reaction product | Reaction product |
| | Acid anhydride | | MHACP | MHACP | MHACP | MHACP | MHACP |
| | Hardening catalyst | | 2E4MZ-CN | 2E4MZ-CN | 2E4MZ-CN | 2E4MZ-CN | 2E4MZ-CN |
| CHAR | Initial peeling off | | None | None | None | None | None |
| | HR | Initial tan δ (%) | 2.5 | 2.7 | 2.5 | 2.4 | 2.4 |
| | | Meg (MΩ) | ∞ | ∞ | ∞ | ∞ | ∞ |
| | | 5 Cycles tan δ (%) | 5.6 | 5.7 | 5.6 | 5.5 | 5.5 |
| | | Meg (MΩ) | ∞ | ∞ | ∞ | ∞ | ∞ |
| | | 10 Cycles tan δ (%) | 9.2 | 9.6 | 9.3 | 9.2 | 9.2 |
| | | Meg (MΩ) | ∞ | ∞ | ∞ | ∞ | ∞ |
| | Weight loss rate after 270° C./10 days (wt. %) | | 5.2 | 5.8 | 5.3 | 5.2 | 5.2 |
| | MR | Bending strength retention rate after 40° C./24 hours (%) | 97 | 96 | 97 | 96 | 96 |

CHAR ... Characteristics, HR ... Heat resistance, MR ... Moisture resistance

TABLE 2

| | | | Embodiment 6 | Embodiment 7 | Embodiment 8 | Embodiment 9 | Embodiment 10 |
|---|---|---|---|---|---|---|---|
| Insulating base sheet | Binding resin | | YL-933 | YL-932 | YL-931 | DER-7342 | 157S65 |
| | Mica | | uncalcined synthetic mica | Piling uncalcined soft mica | Piling uncalcined soft mica | Piling uncalcined soft mica | Piling uncalcined soft mica |
| | Reinforce material | | Glass cloth | Glass cloth | Glass cloth | Glass cloth | Glass cloth |
| | Hardening catalyst | | — | — | — | — | — |
| Thermosetting resin composition | Epoxy resin | | Reaction product | Reaction product | Reaction product | Reaction product | Reaction product |
| | Acid anhydride | | MHACP | MHACP | MHACP | MHACP | MHACP |
| | Hardening catalyst | | 2E4MZ-CN | 2E4MZ-CN | 2E4MZ-CN | 2E4MZ-CN | 2E4MZ-CN |
| CHAR | Initial peeling off | | None | None | None | None | None |
| | HR | Initial tan δ (%) | 2.5 | 2.8 | 2.8 | 1.9 | 2.6 |
| | | Meg (MΩ) | ∞ | ∞ | ∞ | ∞ | ∞ |
| | | 5 Cycles tan δ (%) | 5.8 | 5.9 | 5.9 | 5.7 | 7.6 |
| | | Meg (MΩ) | ∞ | ∞ | ∞ | ∞ | ∞ |
| | | 10 Cycles tan δ (%) | 9.9 | 9.7 | 9.7 | 9.8 | 10.3 |
| | | Meg (MΩ) | ∞ | ∞ | ∞ | ∞ | ∞ |
| | Weight loss rate after 270° C./10 days (wt. %) | | 5.2 | 5.3 | 5.3 | 5.4 | 5.7 |
| | MR | Bending strength retention rate after 40° C./24 hours (%) | 95 | 94 | 97 | 97 | 92 |

CHAR ... Characteristics, HR ... Heat resistance, MR ... Moisture resistance

TABLE 3

| | | | Embodiment 11 | Embodiment 12 | Embodiment 13 | Embodiment 14 | Embodiment 15 |
|---|---|---|---|---|---|---|---|
| Insulating base sheet | Binding resin | | Reaction product | YL-932: 5 DER-332: 1 | YL-931: 2 DER-332: 1 | YL-933: 0.7 DER-332: 1 | YL-933: 0.5 YL-933: 1 |
| | Mica | | Piling uncalcined soft mica | Piling uncalcined soft mica | Piling uncalcined soft mica | Piling uncalcined soft mica | Piling uncalcined soft mica |
| | Reinforce material | | Glass cloth | Glass cloth | Glass cloth | Glass cloth | Glass cloth |
| | Hardening catalyst | | — | — | — | — | — |
| Thermosetting resin composition | Epoxy resin | | Reaction product | Reaction product | Reaction product | Reaction product | Reaction product |
| | Acid anhydride | | MHACP | MHACP | MHACP | MHACP | MHACP |
| | Hardening catalyst | | 2E4MZ-CN | 2E4MZ-CN | 2E4MZ-CN | 2E4MZ-CN | 2E4MZ-CN |
| CHAR | Initial peeling off | | None | None | None | None | None |
| | HR | Initial tan δ (%) | 2.5 | 2.9 | 2.9 | 2.9 | 2.9 |
| | | Meg (MΩ) | ∞ | ∞ | ∞ | ∞ | ∞ |
| | | 5 Cycles tan δ (%) | 5.7 | 5.9 | 6.0 | 6.5 | 10.5 |
| | | Meg (MΩ) | ∞ | ∞ | ∞ | ∞ | ∞ |
| | | 10 Cycles tan δ (%) | 9.2 | 10.3 | 11.2 | 12.4 | 15.9 |
| | | Meg (MΩ) | ∞ | ∞ | ∞ | ∞ | 1000 |
| | Weight loss rate after 270° C./10 days (wt. %) | | 5.4 | 5.8 | 6.2 | 6.2 | 8.2 |
| | MR | Bending strength retention rate after 40° C./24 hours (%) | 98 | 93 | 89 | 87 | 68 |

CHAR ... Characteristics, HR ... Heat resistance, MR ... Moisture resistance

TABLE 4

| | | Embodiment | | | | |
|---|---|---|---|---|---|---|
| | | 16 | 17 | 18 | 19 | 20 |
| Insulating base sheet | Binding resin | YL-933 | YL-933 | YL-933 | YL-933 | YL-933 |
| | Mica | Piling uncalcined soft mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth | Glass cloth |
| | Hardening catalyst | 2EA4MZ-CN | 2EA4MZ-K: 2 | 2EA4MZ-K: 1 | 2EA4MZ-K: 0.5 | 2EA4MZ: 0.1 |
| Thermosetting resin composition | Epoxy resin | Reaction product | Reaction product | Reaction product | Reaction product | Reaction product |
| | Acid anhydride | MHACP | MHACP | MHACP | MHACP | MHACP |
| | Hardening catalyst | — | — | — | — | — |
| CHAR | Initial peeling off | None | None | None | None | None |
| HR | Initial tan δ (%) | 2.5 | 2.5 | 2.5 | 2.5 | 2.5 |
| | Meg (MΩ) | ∞ | ∞ | ∞ | ∞ | ∞ |
| | 5 Cycles tan δ (%) | 5.6 | 5.6 | 5.6 | 5.6 | 5.6 |
| | Meg (MΩ) | ∞ | ∞ | ∞ | ∞ | ∞ |
| | 10 Cycles tan δ (%) | 9.2 | 9.2 | 9.2 | 9.2 | 9.2 |
| | Meg (MΩ) | ∞ | ∞ | ∞ | ∞ | ∞ |
| | Weight loss rate after 270° C./10 days (wt. %) | 5.2 | 5.2 | 5.2 | 5.2 | 5.2 |
| MR | Bending strength retention rate after 40° C./24 hours (%) | 97 | 97 | 97 | 97 | 97 |

CHAR ... Characteristics, HR ... Heat resistance, MR ... Moisture resistance

TABLE 5

| | | Embodiment | | | | |
|---|---|---|---|---|---|---|
| | | 21 | 22 | 23 | 24 | 25 |
| Insulating base sheet | Binding resin | YL-933 | YL-933 | YL-933 | YL-933 | YL-933 |
| | Mica | Piling uncalcined soft mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth | Glass cloth |
| | Hardening catalyst | 2EA4MZ-K: 0.01 | TPPK: 0.1 | IOZ: 0.1 | PX-48T: 0.1 | C11Z-AZINE |
| Thermosetting resin composition | Epoxy resin | Reaction product | Reaction product | Reaction product | Reaction product | Reaction product |
| | Acid anhydride | MHACP | MHACP | MHACP | MHACP | MHACP |
| | Hardening catalyst | — | — | — | — | — |
| CHAR | Initial peeling off | None | None | None | None | None |
| HR | Initial tan δ (%) | 2.5 | 2.5 | 2.9 | 2.5 | 2.5 |
| | Meg (MΩ) | ∞ | ∞ | ∞ | ∞ | ∞ |
| | 5 Cycles tan δ (%) | 5.6 | 5.6 | 5.8 | 5.6 | 5.6 |
| | Meg (MΩ) | ∞ | ∞ | ∞ | ∞ | ∞ |
| | 10 Cycles tan δ (%) | 9.2 | 9.2 | 9.9 | 9.2 | 9.2 |
| | Meg (MΩ) | ∞ | ∞ | ∞ | ∞ | ∞ |
| | Weight loss rate after 270° C./10 days (wt. %) | 5.2 | 5.2 | 7.9 | 5.2 | 5.2 |
| MR | Bending strength retention rate after 40° C./24 hours (%) | 97 | 97 | 87 | 97 | 97 |

CHAR ... Characteristics, HR ... Heat resistance, MR ... Moisture resistance

TABLE 6

| | | Embodiment | | | | |
|---|---|---|---|---|---|---|
| | | 26 | 27 | 28 | 29 | 30 |
| Insulating base sheet | Binding resin | YL-933 | YL-933 | YL-933 | YL-933 | YL-933 |
| | Mica | Piling uncalcined soft mica | Piling uncalcined soft mica | Piling uncalcined soft mica | Piling uncalcined soft mica | Piling uncalcined soft mica |
| | Reinforce material | Polyimide film | Polyimide ether film | Polyether ether ketone film | Polyparabanic acid film | Aramid mixed paper |
| | Hardening catalyst | — | — | — | — | — |
| Thermosetting resin composition | Epoxy resin | Reaction product | Reaction product | Reaction product | Reaction product | Reaction product |
| | Acid anhydride | MHACP | MHACP | MHACP | MHACP | MHACP |
| | Hardening catalyst | 2E4MZ-CN | 2E4MZ-CN | 2E4MZ-CN | 2E4MZ-CN | 2E4MZ-CN |
| CHAR | Initial peeling off | None | None | None | None | None |
| HR | Initial tan δ (%) | 2.0 | 2.0 | 2.0 | 2.0 | 3.5 |
| | Meg (MΩ) | ∞ | ∞ | ∞ | ∞ | ∞ |
| | 5 Cycles tan δ (%) | 3.5 | 3.6 | 5.9 | 6.5 | 7.6 |
| | Meg (MΩ) | ∞ | ∞ | ∞ | ∞ | ∞ |
| | 10 Cycles tan δ (%) | 8.2 | 8.2 | 10.6 | 12.8 | 11.5 |
| | Meg (MΩ) | ∞ | ∞ | ∞ | ∞ | ∞ |
| | Weight loss rate after 270° C./10 days (wt. %) | 5.2 | 5.4 | 5.8 | 6.2 | 6.9 |
| MR | Bending strength retention rate after | 97 | 95 | 90 | 85 | 90 |

TABLE 6-continued

| | | Embodiment | | | | |
|---|---|---|---|---|---|---|
| | | 26 | 27 | 28 | 29 | 30 |
| 40° C./24 hours (%) | | | | | | |

CHAR ... Characteristics, HR ... Heat resistance, MR ... Moisture resistance

TABLE 7

| | | Embodiment | | | | |
|---|---|---|---|---|---|---|
| | | 31 | 32 | 33 | 34 | 35 |
| Insulating base sheet | Binding resin | YL-933 | YL-933 | YL-933 | YL-933 | YL-933 |
| | Mica | Piling uncalcined soft mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth | Glass cloth |
| | Hardening catalyst | — | — | — | — | — |
| Thermosetting resin composition | Epoxy resin | YL-933: 5 DER-332: 1 | YL-933: 3 DER-332: 1 | YL-933: 1 DER-332: 1 | YL-933: 0.5 DER-332: 1 | YL-933: 0.3 DER-332: 1 |
| | Acid anhydride | MHACP | MHACP | MHACP | MHACP | MHACP |
| | Hardening catalyst | 2E4MZ-CN | 2E4MZ-CN | 2E4MZ-CN | 2E4MZ-CN | 2E4MZ-CN |
| CHAR | Initial peeling off | None | None | None | None | None |
| HR | Initial tan δ (%) | 2.7 | 2.5 | 2.5 | 2.5 | 2.5 |
| | Meg (MΩ) | ∞ | ∞ | ∞ | ∞ | ∞ |
| | 5 Cycles tan δ (%) | 5.8 | 5.4 | 5.5 | 6.0 | 7.2 |
| | Meg (MΩ) | ∞ | ∞ | ∞ | ∞ | ∞ |
| | 10 Cycles tan δ (%) | 10.2 | 9.2 | 9.7 | 10.5 | 11.6 |
| | Meg (MΩ) | ∞ | ∞ | ∞ | ∞ | ∞ |
| | Weight loss rate after 270° C./10 days (wt. %) | 4.9 | 4.9 | 5.8 | 6.8 | 7.5 |
| MR | Bending strength retention rate after 40° C./24 hours (%) | 97 | 96 | 92 | 85 | 78 |

CHAR ... Characteristics, HR ... Heat resistance, MR ... Moisture resistance

TABLE 8

| | | Embodiment | | | | |
|---|---|---|---|---|---|---|
| | | 36 | 37 | 38 | 39 | 40 |
| Insulating base sheet | Binding resin | YL-933 | YL-933 | YL-933 | YL-933 | YL-933 |
| | Mica | Piling uncalcined soft mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth | Glass cloth |
| | Hardening catalyst | — | — | — | — | — |
| Thermosetting resin composition | Epoxy resin | YL-933: 0.2 DER-332: 1 | YL-933: 0.1 DER-332: 1 | YL-933: 1 DER-332: 1 | DER-7342: 1 DER-332: 1 | BPAN: 1 DER-332: 1 |
| | Acid anhydride | MHACP | MHACP | MHACP | MHACP | MHACP |
| | Hardening catalyst | 2E4MZ-CN | 2E4MZ-CN | 2E4MZ-CN | 2E4MZ-CN | 2E4MZ-CN |
| CHAR | Initial peeling off | None | None | None | None | None |
| HR | Initial tan δ (%) | 2.5 | 2.5 | 2.5 | 2.5 | 2.5 |
| | Meg (MΩ) | ∞ | ∞ | ∞ | ∞ | ∞ |
| | 5 Cycles tan δ (%) | 7.9 | 8.2 | 5.5 | 5.5 | 5.8 |
| | Meg (MΩ) | ∞ | ∞ | ∞ | ∞ | ∞ |
| | 10 Cycles tan δ (%) | 12.6 | 15.0 | 9.7 | 9.7 | 10.5 |
| | Meg (MΩ) | ∞ | ∞ | ∞ | ∞ | ∞ |
| | Weight loss rate after 270° C./10 days (wt. %) | 7.8 | 8.5 | 5.8 | 5.9 | 6.5 |
| MR | Bending strength retention rate after 40° C./24 hours (%) | 75 | 70 | 92 | 90 | 88 |

CHAR ... Characteristics, HR ... Heat resistance, MR ... Moisture resistance

TABLE 9

| | | Embodiment | | | | |
|---|---|---|---|---|---|---|
| | | 41 | 42 | 43 | 44 | 45 |
| Insulating base sheet | Binding resin | YL-933 | YL-933 | YL-933 | YL-933 | YL-933 |
| | Mica | Piling uncalcined soft mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth | Glass cloth |
| | Hardening catalyst | — | — | — | — | — |
| Thermosetting resin composition | Epoxy resin | YL-931: 1 DER-332: 1 | YL-933 | YL-932 | YL-933: 1 DER-332: 1 | YL-933: 1 DER-332: 1 |
| | Acid anhydride | MHACP | MHACP | MHACP | MHACP | MHACP |
| | Hardening catalyst | 2E4MZ-CN | 2E4MZ-CN | 2E4MZ-CN | BTPP-0.25 | PX-4BT |
| CHAR | Initial peeling off | None | None | None | None | None |
| HR | Initial tan δ (%) | 2.5 | 2.5 | 2.5 | 2.5 | 2.5 |

TABLE 9-continued

| | | | Embodiment | | | | |
|---|---|---|---|---|---|---|---|
| | | | 41 | 42 | 43 | 44 | 45 |
| | 5 Cycles | Meg (MΩ) | ∞ | ∞ | ∞ | ∞ | ∞ |
| | | tan δ (%) | 5.8 | 5.4 | 5.3 | 5.5 | 5.5 |
| | 10 Cycles | Meg (MΩ) | ∞ | ∞ | ∞ | ∞ | ∞ |
| | | tan δ (%) | 9.9 | 9.2 | 9.0 | 9.7 | 9.7 |
| | | Meg (MΩ) | ∞ | ∞ | ∞ | ∞ | ∞ |
| | Weight loss rate after 270° C./10 days (wt. %) | | 6.0 | 5.2 | 4.9 | 5.2 | 5.2 |
| MR | Bending strength retention rate after 40° C./24 hours (%) | | 92 | 95 | 97 | 95 | 95 |

CHAR ... Characteristics, HR ... Heat resistance, MR ... Moisture resistance

TABLE 10

| | | Embodiment | | | | |
|---|---|---|---|---|---|---|
| | | 46 | 47 | 48 | 49 | 50 |
| Insulating base sheet | Binding resin | YL-933 | YL-933 | YL-933 | YL-933 | YL-933 |
| | Mica | Piling uncalcined soft mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth | Glass cloth |
| | Hardening catalyst | — | — | — | — | — |
| Thermosetting resin composition | Epoxy resin | YL-933: 5 DER-332: 1 | YL-931: 1 DER-332: 1 | YL-933: 1 DER-332: 1 | YL-933: 1 DER-332: 1 | YL-933: 1 DER-332: 1 |
| | Acid anhydride | MHACP | HN-5500 | HN-2200 | MHACP | MHACP |
| | Hardening catalyst | TPP | IOZ | 2E4MZ-K | TEA-K | — |
| CHAR | Initial peeling off | None | None | None | None | None |
| HR | Initial tan δ (%) | 2.5 | 2.5 | 2.5 | 2.5 | 2.5 |
| | Meg (MΩ) | ∞ | ∞ | ∞ | ∞ | ∞ |
| | 5 Cycles tan δ (%) | 5.8 | 6.5 | 7.2 | 5.8 | 5.8 |
| | Meg (MΩ) | ∞ | ∞ | ∞ | ∞ | ∞ |
| | 10 Cycles tan δ (%) | 9.9 | 12.3 | 15.3 | 9.9 | 9.9 |
| | Meg (MΩ) | ∞ | 1000 | 800 | ∞ | ∞ |
| | Weight loss rate after 270° C./10 days (wt. %) | 6.0 | 7.5 | 8.5 | 5.9 | 5.9 |
| MR | Bending strength retention rate after 40° C./24 hours (%) | 92 | 92 | 90 | 95 | 95 |

CHAR ... Characteristics, HR ... Heat resistance, MR ... Moisture resistance

TABLE 11

| | | Embodiment | | | | |
|---|---|---|---|---|---|---|
| | | 51 | 52 | 53 | 54 | 55 |
| Insulating base sheet | Binding resin | YL-933: 100 | YL-933: 100 PSF: 54.0 | YL-933: 100 M: 61.2 | YL-933: 100 VH4150: 60.2 | YL-933: 100 CN: 61.2 |
| | Mica | Piling uncalcined soft mica | Piling uncalcined soft mica | Piling calcined hand mica | Piling calcined hand mica | Piling uncalcined hand mica |
| | Reinforce material | Glass cloth | Glass cloth | Glass cloth | Glass cloth | Glass cloth |
| | Hardening catalyst | C11Z-AZINE 0.1 wt % | TEA-K: 0.1 wt % | TEA-K: 0.1 wt % | TEA-K: 0.1 wt % | TEA-K: 0.1 wt % |
| Thermosetting resin composition | Epoxy resin | Reaction product | Reaction product | Reaction product | Reaction product | Reaction product |
| | Acid anhydride | MHACP | MHACP | MHACP | MHACP | MHACP |
| | Hardening catalyst | 2E4MZ-CN | 2E4MZ-CN | 2E4MZ-CN | 2E4MZ-CN | 2E4MZ-CN |
| CHAR | Initial peeling off | None | None | None | None | None |
| HR | Initial tan δ (%) | 1.0 | 1.2 | 1.0 | 1.4 | 2.4 |
| | Meg (MΩ) | ∞ | ∞ | ∞ | ∞ | ∞ |
| | 5 Cycles tan δ (%) | 1.6 | 1.7 | 1.6 | 1.5 | 3.5 |
| | Meg (MΩ) | ∞ | ∞ | ∞ | ∞ | ∞ |
| | 10 Cycles tan δ (%) | 3.2 | 3.3 | 3.3 | 5.2 | 6.2 |
| | Meg (MΩ) | ∞ | ∞ | ∞ | ∞ | ∞ |
| | Weight loss rate after 270° C./10 days (wt. %) | 4.2 | 4.3 | 3.3 | 4.2 | 4.5 |
| MR | Bending strength retention rate after 40° C./24 hours (%) | 97 | 96 | 98 | 96 | 96 |

CHAR ... Characteristics, HR ... Heat resistance, MR ... Moisture resistance

TABLE 12

| | | Embodiment | | | | |
|---|---|---|---|---|---|---|
| | | 56 | 57 | 58 | 59 | 60 |
| Insulating base sheet | Binding resin | YL-933: 100 RN: 54.6 | YL-933: 100 PN: 43.4 | YL-933: 100 PN: 43.4 | YL-933: 100 PN: 43.4 | YL-933: 100 PN: 43.4 |

TABLE 12-continued

| | | Embodiment | | | | |
|---|---|---|---|---|---|---|
| | | 56 | 57 | 58 | 59 | 60 |
| | Mica | Piling uncalcined soft mica | Piling uncalcined soft mica | Piling calcined hand mica | Piling calcined hand mica | Piling uncalcined hand mica |
| | Reinforce material | Glass cloth | Glass cloth | Glass cloth | Glass cloth | Glass cloth |
| | Hardening catalyst | TEA-K: 0.1 wt % | TEA-K: 1.0 wt % | TEA-K: 1.0 wt % | TEA-K: 0.5 wt % | TEA-K: 0.5 wt % |
| Thermosetting resin composition | Epoxy resin | Reaction product | Reaction product | Reaction product | VL933: 1 DER-332: 1 | YL-932: 1 DER-332: 1 |
| | Acid anhydride | MHACP | MHACP | MHACP | MHACP | MHACP |
| | Hardening catalyst | 2E4MZ-CN | — | — | — | — |
| CHAR | Initial peeling off | None | None | None | None | None |
| HR | Initial tan δ (%) | 1.0 | 1.2 | 1.0 | 1.4 | 2.4 |
| | Meg (MΩ) | ∞ | ∞ | ∞ | ∞ | ∞ |
| | 5 Cycles tan δ (%) | 1.6 | 1.7 | 1.6 | 1.5 | 3.5 |
| | Meg (MΩ) | ∞ | ∞ | ∞ | ∞ | ∞ |
| | 10 Cycles tan δ (%) | 3.2 | 3.3 | 3.3 | 5.2 | 6.2 |
| | Meg (MΩ) | ∞ | ∞ | ∞ | ∞ | ∞ |
| | Weight loss rate after 270° C./10 days (wt. %) | 4.2 | 4.3 | 3.3 | 4.2 | 4.5 |
| MR | Bending strength retention rate after 40° C./24 hours (%) | 97 | 96 | 98 | 96 | 96 |

CHAR ... Characteristics, HR ... Heat resistance, MR ... Moisture resistance

TABLE 13

| | | Embodiment | | | | |
|---|---|---|---|---|---|---|
| | | 61 | 62 | 63 | 6 | 7 |
| Insulating base sheet | Binding resin | YL-933: 100 RN: 43.4 | YL-933: 100 PN: 43.4 | YL-933: 100 PN: 43.4 | YL-438: 100 PN: 43.4 | YL-438: 100 PN: 43.4 |
| | Mica | Piling calcined hand mica | Piling calcined hand mica | Piling calcined hand mica | Piling calcined hand mica | Piling calcined hand mica |
| | Reinforce material | Glass cloth | Glass cloth | Glass cloth | Glass cloth | Glass cloth |
| | Hardening catalyst | TEA-K: 0.5 wt % | TEA-K: 0.5 wt % | TEA-K: 0.5 wt % | TEA-K: 0.5 wt % | TEA-K: 0.5 wt % |
| Thermosetting resin composition | Composition | BMI: 70 DABF: 30 TAIC: 67 | BMI: 70 DER-332: 50 MHACP: 50.8 | DAPPI: 30 DER-332: 50 MHACP: 50.8 | BMI: 70 DABF: 30 TAIC: 67 | DAPPI: 30 DER-332: 50 MHACP: 50.8 |
| | Hardening catalyst | 2E4MZ-CN | 2E4MZ-CN | 2E4MZ-CN | 2E4MZ-CN | 2E4MZ-CN |
| CHAR | Initial peeling off | None | None | None | Exist | Exist |
| HR | Initial tan δ (%) | 2.5 | 2.5 | 2.5 | 3.4 | 3.4 |
| | Meg (MΩ) | ∞ | ∞ | ∞ | ∞ | ∞ |
| | 5 Cycles tan δ (%) | 3.2 | 5.7 | 5.6 | 7.5 | 9.8 |
| | Meg (MΩ) | ∞ | ∞ | ∞ | ∞ | ∞ |
| | 10 Cycles tan δ (%) | 4.2 | 9.6 | 9.3 | 20.2 | 17.5 |
| | Meg (MΩ) | ∞ | ∞ | ∞ | 100 | 50 |
| | Weight loss rate after 270° C./10 days (wt. %) | 3.2 | 6.8 | 6.3 | 20.2 | 25.3 |
| MR | Bending strength retention rate after 40° C./24 hours (%) | 97 | 91 | 92 | 66 | 46 |

CHAR ... Characteristics, HR ... Heat resistance, MR ... Moisture resistance

TABLE 14

| | | Embodiment | | | | |
|---|---|---|---|---|---|---|
| | | 1 | 2 | 3 | 4 | 5 |
| Insulating base sheet | Binding resin | DER-332 | E-807 | DEN-438 | CEL-2021 | Silicon resin |
| | Mica | Piling uncalcined soft mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth | Glass cloth |
| | Hardening catalyst | — | — | — | — | — |
| Thermosetting resin composition | Epoxy resin | YL-933: 1 DER-332: 1 | YL-933: 1 DER-332: 1 | YL-933: 1 DER-332: 1 | YL-933: 1 DER-332: 1 | YL-933: 0.3 DER-332: 1 |
| | Acid anhydride | MHACP | MHACP | MHACP | MHACP | MHACP |
| | Hardening catalyst | 2E4MZ-CN | 2E4MZ-CN | 2E4MZ-CN | 2E4MZ-CN | 2E4MZ-CN |
| CHAR | Initial peeling off | Exist | Exist | Exist | Exist | Exist |
| HR | Initial tan δ (%) | 2.5 | 2.5 | 2.5 | 2.5 | 2.5 |
| | Meg (MΩ) | ∞ | ∞ | ∞ | ∞ | ∞ |
| | 5 Cycles tan δ (%) | 18.6 | 22.3 | 18.5 | 25.3 | 10.5 |
| | Meg (MΩ) | 100 | 100 | 100 | 80 | 100 |
| | 10 Cycles tan δ (%) | 22.7 | 24.5 | 20.6 | 26.5 | 18.6 |
| | Meg (MΩ) | 80 | 50 | 80 | 5 | 100 |
| | Weight loss rate after 270° C./10 days (wt. %) | 15.3 | 20.3 | 18.8 | 23.3 | 10.3 |
| MR | Bending strength | 85 | 70 | 85 | 35 | 35 |

TABLE 14-continued

| | Embodiment | | | | |
|---|---|---|---|---|---|
| | 1 | 2 | 3 | 4 | 5 |
| retention rate after 40° C./24 hours (%) | | | | | |

CHAR ... Characteristics, HR ... Heat resistance, MR ... Moisture resistance

TABLE 15

| | | Embodiment | | | |
|---|---|---|---|---|---|
| | | 65 | 66 | 67 | 68 |
| Insulating base sheet | Binding resin | YL-933: 100 DER-332: 0 PSF: 54 | YL-933: 100 DER-332: 0 PSF: 54 | YL-933: 75 DER-332: 22 PSF: 54 | YL-933: 75 DER-332: 0 PSF: 54 |
| | Mica | Piling uncalcined soft mica | Piling uncalcined soft mica | Piling uncalcined soft mica | Piling uncalcined soft mica |
| | Reinforce material | Glass cloth | Glass cloth | Glass cloth | Glass cloth |
| | Hardening catalyst | TEA-K: 0.5 wt % | TEA-K: 0.5 wt % | TEA-K: 0.5 wt % | TEA-K: 0.5 wt % |
| Thermosetting resin composition | Epoxy resin | YL-932: 1 DER-332: 1 | YL-932: 1 DER-332: 1 | YL-932: 1 DER-332: 1 | YL-932: 1 DER-332: 1 |
| | Acid anhydride | MHACP | MHACP | MHACP | MHACP |
| Hardening condition °C./h + °C./h + °C./h | | 100/10 + 150/3 + 230/10 | 100/5 + 150/3 + 200/5 | 100/5 + 150/3 + 200/5 | 100/3 + 150/2 + 170/5 |

What is claimed is:

1. An electrically insulated coil comprising
a plurality of conductors forming stacked layers which are electrically insulated from each other with layer insulators,
layers of an insulating base sheet reinforced with a binding resin and wound onto said stacked layers of conductors, and
a thermosetting impregnation resin impregnated into said layers of the insulating base sheet and hardened,
wherein
said binding resin is a composition comprising 100-50 parts by weight of a poly-functional epoxy resin having at least three of p-(2,3-epoxy propoxy) phenyl groups and at most 50 parts by weight of a bi-functional epoxy resin, and wherein
said impregnation resin is a composition comprising 100-50 parts by weight of a bi-functional epoxy resin and at most 50 parts by weight of said poly-functional epoxy resin.

2. An electrically insulated coil comprising
a plurality of conductors forming stacked layers which are electrically insulated from each other with layer insulators,
layers of an insulating base sheet reinforced with a binding resin and wound onto said stacked layers of conductors, and
a thermosetting impregnation resin impregnated into said layers of the insulating base sheet and hardened,
wherein
said binding resin is a composition comprising 100-50 parts by weight of a poly-functional epoxy resin having at least three of p-(2,3-epoxy propoxy) phenyl groups, at most 50 parts by weight of a bi-functional epoxy resin and an acid anhydride as a hardening agent and wherein said impregnation resin is a composition comprising 100-50 parts by weight of a bi-functional epoxy resin and at most 50 parts by weight of said poly-functional epoxy resin.

3. An electrically insulated coil comprising
a plurality of conductors forming stacked layers which are electrically insulated from each other with layer insulators,
layers of an insulating base sheet reinforced with a binding resin and wound onto said stacked layers of conductors, and
a thermosetting impregnation resin impregnated into said layers of the insulating base sheet and hardened,
wherein
said binding resin is substantially a poly-functional epoxy resin having at least three of p-(2,3-epoxy propoxy) phenyl groups, and wherein
said impregnation resin is a composition comprising 100-50 parts by weight of a bi-functional epoxy resin and at most 50 parts by weight of said poly-functional epoxy resin and an acid anhydride in an amount sufficient to act as a hardening agent for said impregnation resin and said binding resin of the poly-functional epoxy resin.

4. An electrically insulated coil comprising
a plurality of conductors forming stacked layers which are electrically insulated from each other with layer insulators,
layers of an insulating base sheet reinforced with a binding resin and wound onto said stacked layers of conductors, and
a thermosetting impregnation resin impregnated into said layers of the insulating base sheet and hardened,
wherein
said binding resin is a composition comprising 100-50 parts by weight of a poly-functional epoxy resin having at least three of p-(2,3-epoxy propoxy) phenyl groups and at most 50 parts by weight of a bi-functional epoxy resin, and wherein
said impregnation resin is a composition comprising an epoxy resin, a thermosetting maleimide resin and an acid anhydride.

5. An electrically insulated coil comprising
a plurality of conductors forming stacked layers which are electrically insulated from each other with layer insulators, layers of an insulating base sheet reinforced with a binding resin and wound onto said stacked layers of conductors, and a thermosetting impregnation resin impregnated into said layers of the insulating base sheet and hardened, wherein said binding resin is a composition comprising 100-50 parts by weight of a poly-functional resin having at least three of p-(2,3-epoxy propoxy) phenyl groups and at most 50 parts by weight of a bi-functional epoxy resin, and wherein said impregnation resin is a composition comprising thermosetting maleimide resin.

6. An electrically insulated coil as claimed in claim 1, wherein said binding resin is a composition comprising 80-55 parts by weight of said poly-functional epoxy resin and 20-45 parts by weight of a bi-functional epoxy resin, and said impregnation resin is a composition comprising 80-55 parts by weight of a bi-functional epoxy resin and 20-45 parts by weight of said poly-functional epoxy resin.

7. An insulating sheet using for manufacturing of an electrically insulated coil wherein said insulating sheet is reinforced with a composition comprising 100-50 parts by weight of a poly-functional epoxy resin having at least three of p-(2,3-epoxy propoxy) phenyl groups and at most 50 parts by weight of a bi-functional epoxy resin as a binding resin.

8. An insulating sheet using for manufacturing of an electrically insulated coil wherein said insulating sheet is manufactured by binding of a mica sheet and an insulating sheet reinforced with a composition comprising 100-50 parts by weight of a poly-functional epoxy resin having at least three of p-(2,3-epoxy propoxy) phenyl groups, at most 50 parts by weight of a bi-functional epoxy resin, and a hardening agent for phenolic resin.

* * * * *